(12) United States Patent
Lin

(10) Patent No.: US 7,755,682 B2
(45) Date of Patent: Jul. 13, 2010

(54) COLOR INTERPOLATION METHOD FOR BAYER FILTER ARRAY IMAGES

(75) Inventor: Wen-Kuo Lin, Taipei (TW)

(73) Assignee: ITE Tech. Inc., Hsinchu (TW)

( * ) Notice: Subject to any disclaimer, the term of this patent is extended or adjusted under 35 U.S.C. 154(b) by 1141 days.

(21) Appl. No.: 11/391,411

(22) Filed: Mar. 29, 2006

(65) Prior Publication Data
US 2007/0229684 A1 Oct. 4, 2007

(51) Int. Cl.
*H04N 5/335* (2006.01)
(52) U.S. Cl. .................................. 348/273; 348/222.1
(58) Field of Classification Search ............... 348/222.1, 348/273; 382/276, 293, 300
See application file for complete search history.

(56) References Cited

U.S. PATENT DOCUMENTS

| | | | |
|---|---|---|---|
| 6,628,330 B1* | 9/2003 | Lin | 348/252 |
| 6,744,916 B1* | 6/2004 | Takahashi | 382/162 |
| 7,333,678 B1* | 2/2008 | Huang et al. | 382/300 |
| 2002/0191104 A1* | 12/2002 | Matsutani et al. | 348/441 |
| 2004/0061902 A1* | 4/2004 | Tang et al. | 358/3.01 |
| 2005/0030396 A1* | 2/2005 | Park et al. | 348/252 |
| 2006/0133697 A1* | 6/2006 | Uvarov et al. | 382/300 |
| 2006/0209199 A1* | 9/2006 | Tanaka | 348/272 |

* cited by examiner

*Primary Examiner*—Tuan Ho
*Assistant Examiner*—Kent Wang
(74) *Attorney, Agent, or Firm*—Jianq Chyun IP Office

(57) ABSTRACT

The present invention relates to a color interpolation method for Bayer filter array images. The method first inputs a 3×3 Bayer pattern block with a center pixel. Next, a color filter interpolation case is determined according to the type of the center pixel. Next, Bayer pixel averages and Bayer pixel differences in horizontal and vertical directions of the color filter interpolation case are obtained. Next, missing color components of the center pixel are interpolated in both horizontal and vertical directions. Next, color differences in the horizontal and vertical directions are obtained based on the Bayer pixel differences and averages. Next, a pixel activity of the 3×3 Bayer pixel block is determined. Finally, interpolated color components in the direction of lower color differences are selected, when the pixel activity is high.

10 Claims, 9 Drawing Sheets

| | | |
|---|---|---|
| G | B | G |
| R | G | R |
| G | B | G |

IV: G center at B row

| | | |
|---|---|---|
| R | G | R |
| G | B | G |
| R | G | R |

III: B center

| | | |
|---|---|---|
| B | G | B |
| G | R | G |
| B | G | B |

II: R center

| | | |
|---|---|---|
| G | R | G |
| B | G | B |
| G | R | G |

I: G center at R row

FIG. 2 (Prior Art)

| a2 | a5 | a8 |
|----|----|----|
| a1 | a4 | a7 |
| a0 | a3 | a6 |

FIG. 3 (Prior Art)

COLOR INTERPOLATION METHOD FOR BAYER FILTER ARRAY IMAGES

BACKGROUND OF THE INVENTION

1. Field of the Invention

The present invention relates generally to a color interpolation, and more particularly, to a Bayer array interpolation method. The disclosure of the present invention can be applied to an image processing apparatus and method.

2. Description of the Prior Art

The human visual system (HVS) has three types of cones namely long-cone, medium-cone, and short-cone which sense light wave length corresponding to red, green, and blue colors, respectively. The visual cortex of the human brain then takes signals from these three types of cones and performs interpolation to form a perceived image. The significance of this biological structure of the human visual system is to dramatically reduce an enormous amount of entire visible spectrum information needed to be processed into only three-color components.

Digital image sensors in digital cameras are therefore designed to be analogous to the cones of the human visual system. One most commonly used image sensor array is called Bayer filter sensor array 100 located in a Bayer pattern image sensor 10, as shown in FIG. 1, taught by Bryce E. Bayer in U.S. Pat. No. 3,971,065. A Bayer filter array has red, green, and blue color filter micro lenses superimposed on the photo sensors to respectively acquire spectrum information of long-, medium, and short-wavelengths. Furthermore, the Bayer filter array samples the green information on a quincunx grip and the red and the blue information on a rectangular grid. The green information is sampled at a higher frequency because the peak sensitivity of the human visual system lies in the medium wavelengths. The missing color information of the other two colors of an individual photo sensor is then interpolated using the color values of neighboring pixels.

FIG. 2 shows color interpolation cases for the 3×3 Bayer filter array. Case I and Case IV are green (G) center, so the color components needed to be interpolated are red and blue colors. Case II is red (R) center, so the color components to be interpolated are green and blue. Case III is blue (B) center, so the color components to be interpolated are green and red.

For convenience, pixels in the 3×3 block of each Bayer array case can be assigned to the numbers shown in FIG. 3.

A direct method for Bayer array interpolation in the prior arts is to exploit a linear interpolation and the missing pixels of each Bayer array case are interpolated as follows:

Case I:

$R=(a3+a5)/2$ $B=(a1+a7)/2$

Case II:

$G=(a1+a3+a5+a7)/4$ $B=(a0+a2+a6+a8)/4$

Case III:

$G=(a1+a3+a5+a7)/4$ $R=(a0+a2+a6+a8)/4$

Case IV:

$R=(a1+a7)/2$ $B=(a3+a5)/2$

Another method for the Bayer array interpolation in the prior arts is taught by Robert H. Hibbard in U.S. Pat. No. 5,382,976 and Laroche, et al. in U.S. Pat. No. 5,373,322. The disclosure is to exploit the edge information to determine the neighbor pixels to be used for interpolation. One example of such method is shown in FIG. 4. The procedure first inputs a 3×3 Bayer pattern block, as shown in step S10. In step S12, the Bayer array case of the input block is determined according to those shown in FIG. 2. In step S14, the Bayer array case is classified into two categories: green pixel center and not green pixel center. If the center pixel is not the green pixel, then the Bayer cases are Case II and Case III, so the green pixel differences are calculated in step S16 as $H\_diff=|a3-a5|$ and $V\_diff=|a1-a7|$.

The missing green pixel is then interpolated in step S20 as if H_diff<V_diff $G=(a3+a5)/2$ else if V_diff<H_diff $G=(a1+a7)/2$ else $G=(a1+a3+a5+a7)/4$.

The missing red or blue pixel is then interpolated in step S22 as if Case II $B=(a0+a2+a6+a8)/4$ else if Case III $R=(a0+a2+a6+a8)/4$.

On the other hand, if the center pixel is green, then the missing red and blue pixels are interpolated in step S18 as
if Case I $R=(a3+a5)/2$ $B=(a1+a7)/2$ else if Case IV $R=(a1+a7)/2$ $B=(a3+a5)/2$.

However, if the missing color pixels of Bayer color filter array are interpolated by using the above mentioned methods, the color differences among all three-color pixels may become significant and results in an unpleasant color aberration occurring at high transition edges. Furthermore, in order to better reconstructing the missing pixels, Laroche, et al. in U.S. Pat. No. 5,373,322 and Peter N. Martin in U.S. Pat. No. 6,549,233 teach a wider Bayer filter array with more neighbor pixels, that adversely increases the implementation cost for the hardware implementation. D. Alleysson, S. Susstrunk, and J. Herault teach "Linear Demosaicing inspired by the Human Visual System", in IEEE Transaction of Image Processing, vol. 14, No. 4, April 2005, pp. 439-449. The disclosure of D. Alleysson, et al. is more complicated Bayer filter array interpolation methods even requiring the interpolation process to be performed in the frequency domain. Endo, et al. in U.S. Pat. No. 6,853,748 and Acharya, et al. U.S. Pat. No. 6,917,381 teach multiplication and division methods for the Bayer array interpolation, that also increases the hardware implementation cost.

SUMMARY OF THE INVENTION

An objective of the present invention is to solve the above-mentioned problems and to provide a color interpolation method for Bayer filter array images that not only uses just a 3×3 pixel block, but also improves reconstruction accuracy by exploiting both edge and color difference information.

The present invention achieves the above-indicated objective by providing a color interpolation method for Bayer filter array images. The method first inputs a 3×3 Bayer pattern block with a center pixel. Next, a color filter interpolation case is determined according to the type of the center pixel. Next, Bayer pixel averages and Bayer pixel differences in horizontal and vertical directions of the color filter interpolation case are obtained. Next, missing color components of the center pixel are interpolated in both horizontal and vertical directions. Next, color differences in the horizontal and vertical directions are obtained based on the Bayer pixel differences and averages. Next, a pixel activity of the 3×3 Bayer pixel block is determined. Finally, interpolated color components in the direction of lower color differences are selected, when the pixel activity is high.

The following detailed description, given by way of example and not intended to limit the invention solely to the embodiments described herein, will best be understood in conjunction with the accompanying drawings.

BRIEF DESCRIPTION OF THE DRAWINGS

FIG. 2 shows color interpolation cases for the 3×3 Bayer filter array.

FIG. 3 shows pixel numbers in a 3×3 Bayer array.

DETAILED DESCRIPTION OF THE PREFERRED EMBODIMENTS

The present invention discloses a color interpolation method for Bayer filter array images that not only uses just a 3×3 pixel block, but also improves reconstruction accuracy by exploiting both edge and color difference information.

Figure 1:
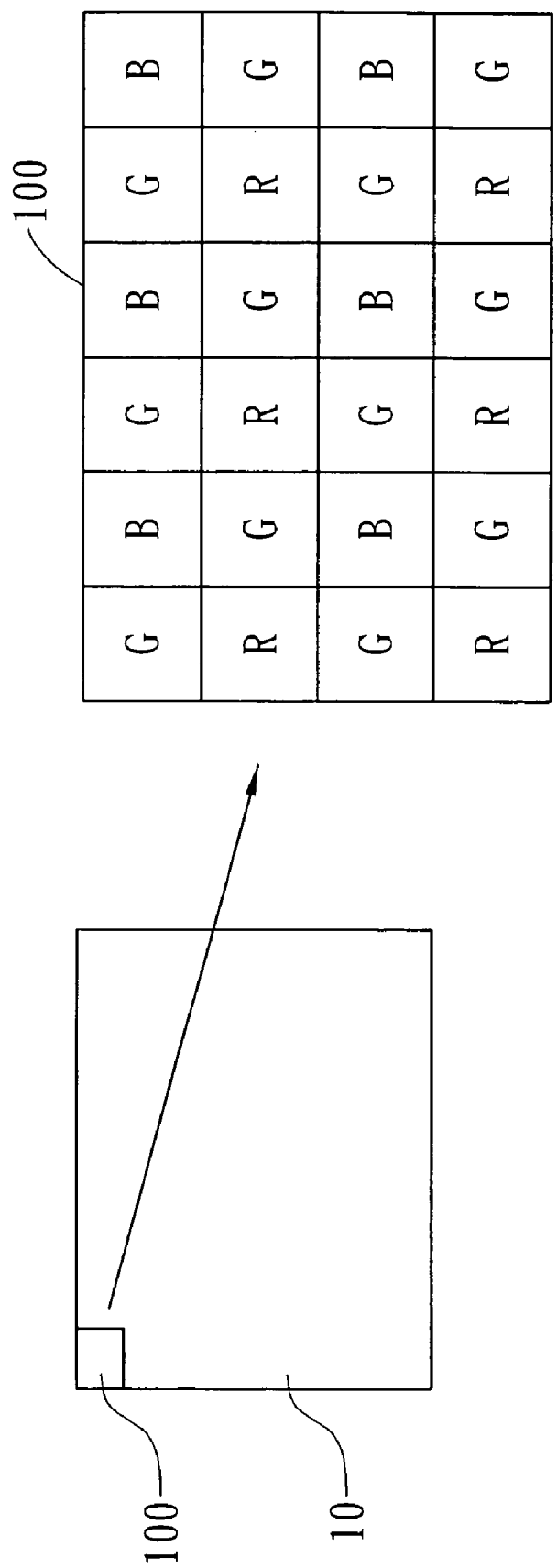
FIG. 1 shows Bayer filter sensor array.
Figure 4:
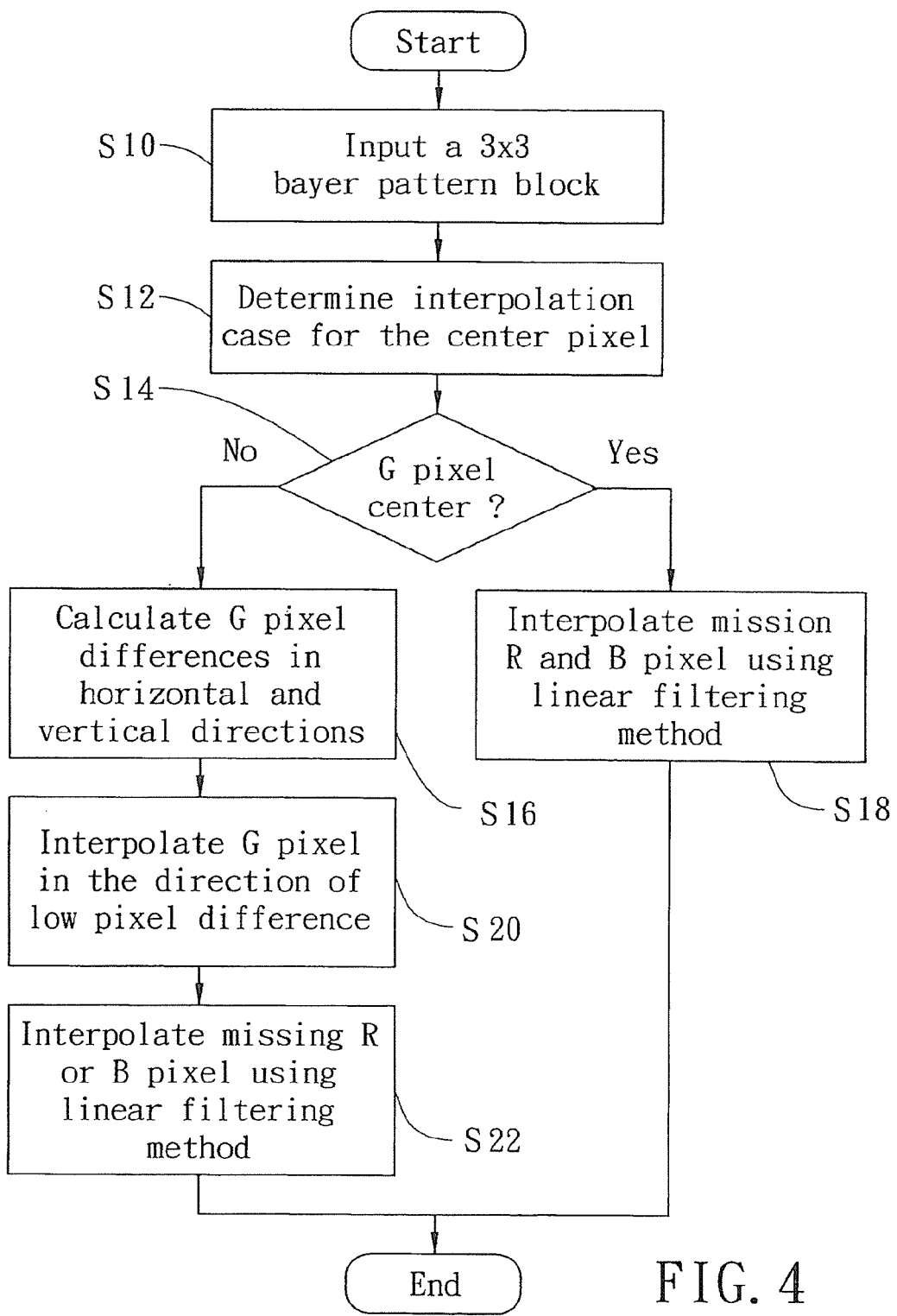
FIG. 4 is a flow chart showing the steps for the Bayer array interpolation method using edge information.
Figure 5A:
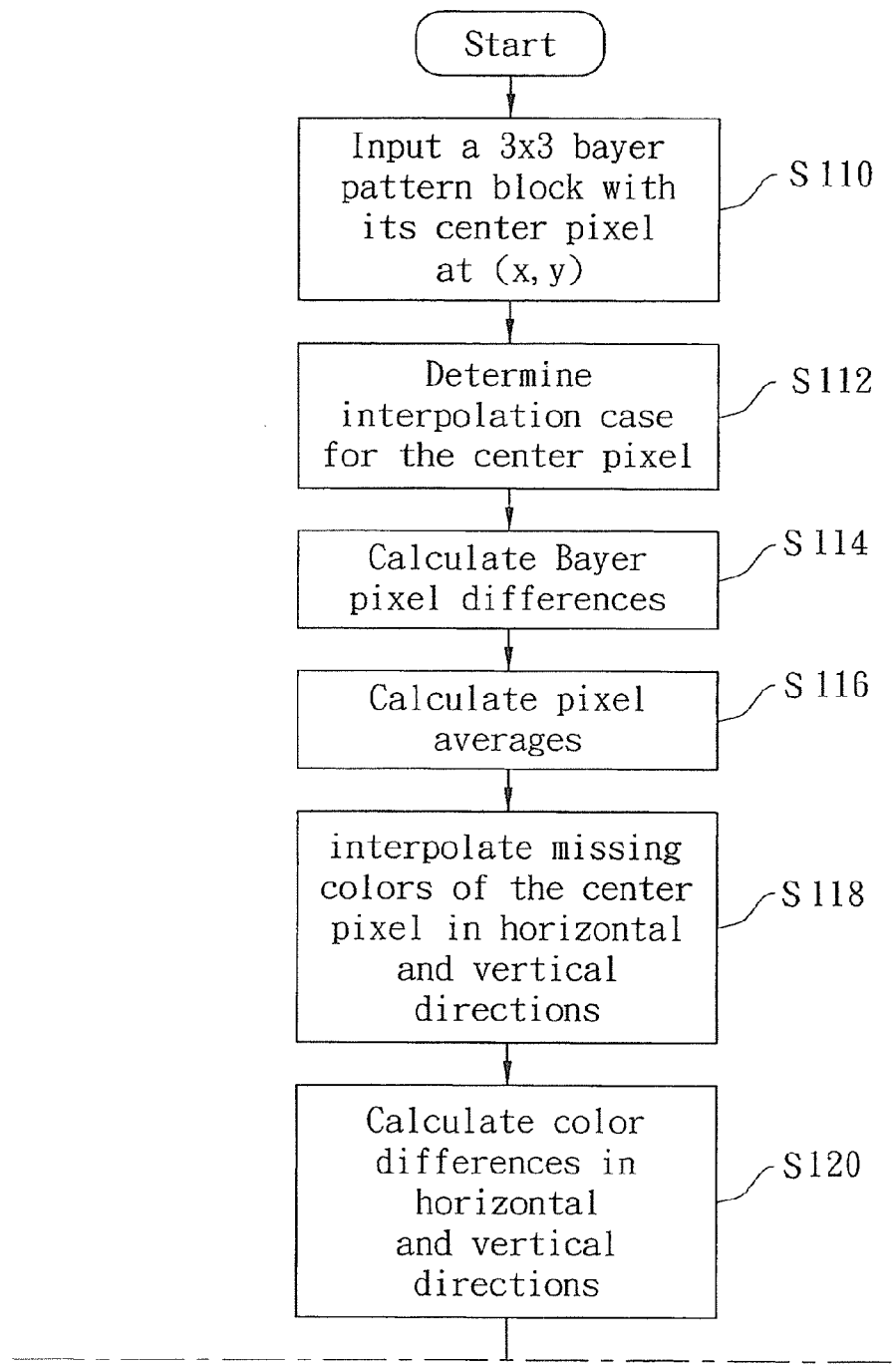
FIGS. 5A and 5B are a flow chart showing the steps for a Bayer array interpolation method of the present invention.
Figure 5B:
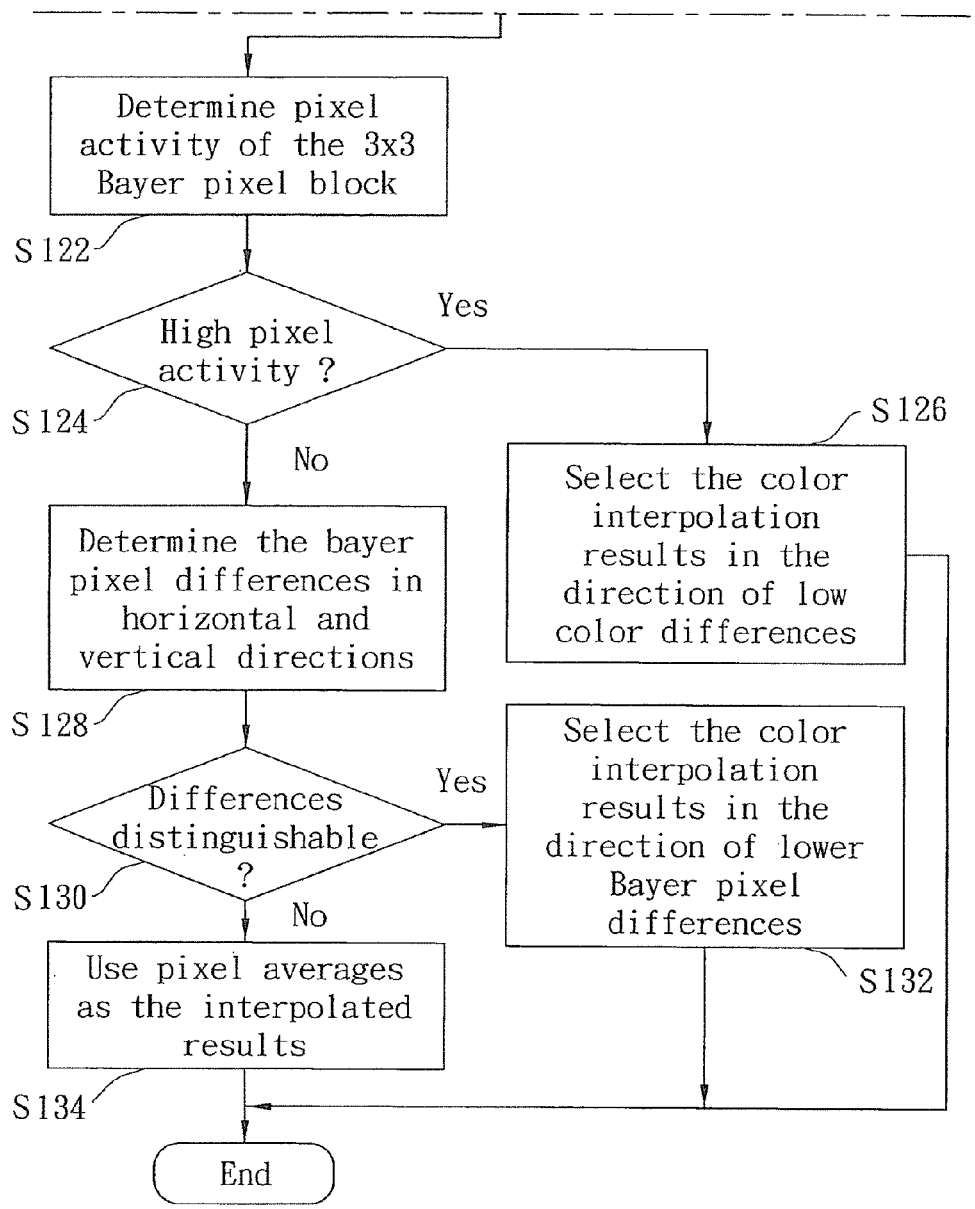

FIGS. 5A and 5B are a flow chart showing the steps for a Bayer array interpolation method of the present invention. The procedure first inputs a 3×3 Bayer pattern block with its center pixel at (x,y), as shown in step S110.

In step S112, a color filter interpolation case is determined according to the type of the center pixel. The Bayer interpolation case is the same as those shown in FIG. 2.

In step S114, Bayer pixel differences in horizontal and vertical directions of the color filter interpolation case are calculated.

In step S116, Bayer pixel averages of the color filter interpolation case are obtained. The methods for calculating Bayer pixel differences and averages will be discussed in more details in the preferred embodiment.

In step S118, missing color components of the center pixel are interpolated in both horizontal and vertical directions.

In step S120, color differences in both horizontal and vertical directions are calculated based on the interpolated results including the Bayer pixel differences and averages.

In step S122, a pixel activity of the 3×3 Bayer pixel block is determined.

In step S124, if there is a high pixel activity, then the procedure goes to step S126; otherwise the procedure goes to step S128.

In step S126, interpolated color components in the direction of lower color differences are selected.

On the other hand, if there is a low pixel activity, then the Bayer pixel differences in both horizontal and vertical directions are determined, in step S128.

In step S130, if the difference in one direction is significant than another, then the procedure goes to step S132; otherwise the procedure goes to step S134.

In step S132, the color interpolation results in the direction of lower Bayer pixel difference of the Bayer pixel difference are selected.

However, if the pixel differences in both horizontal and vertical directions are not significantly different, the pixel average values are used as the interpolated colors, in step S134.

Embodiment 1

Figure 6A:
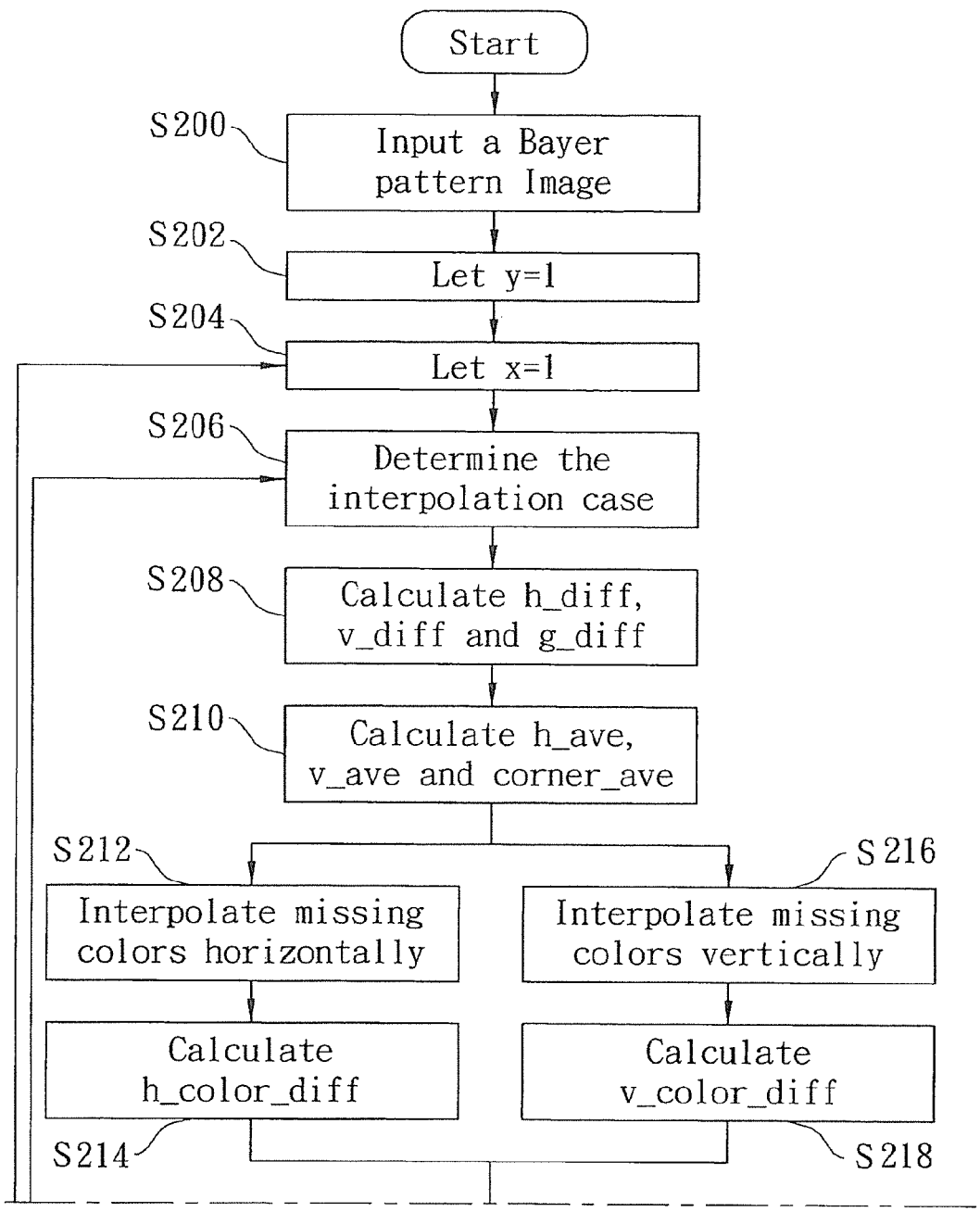
FIGS. 6A and 6B are a flow chart showing a preferred embodiment of the Bayer array interpolation method of the present invention.
Figure 6B:
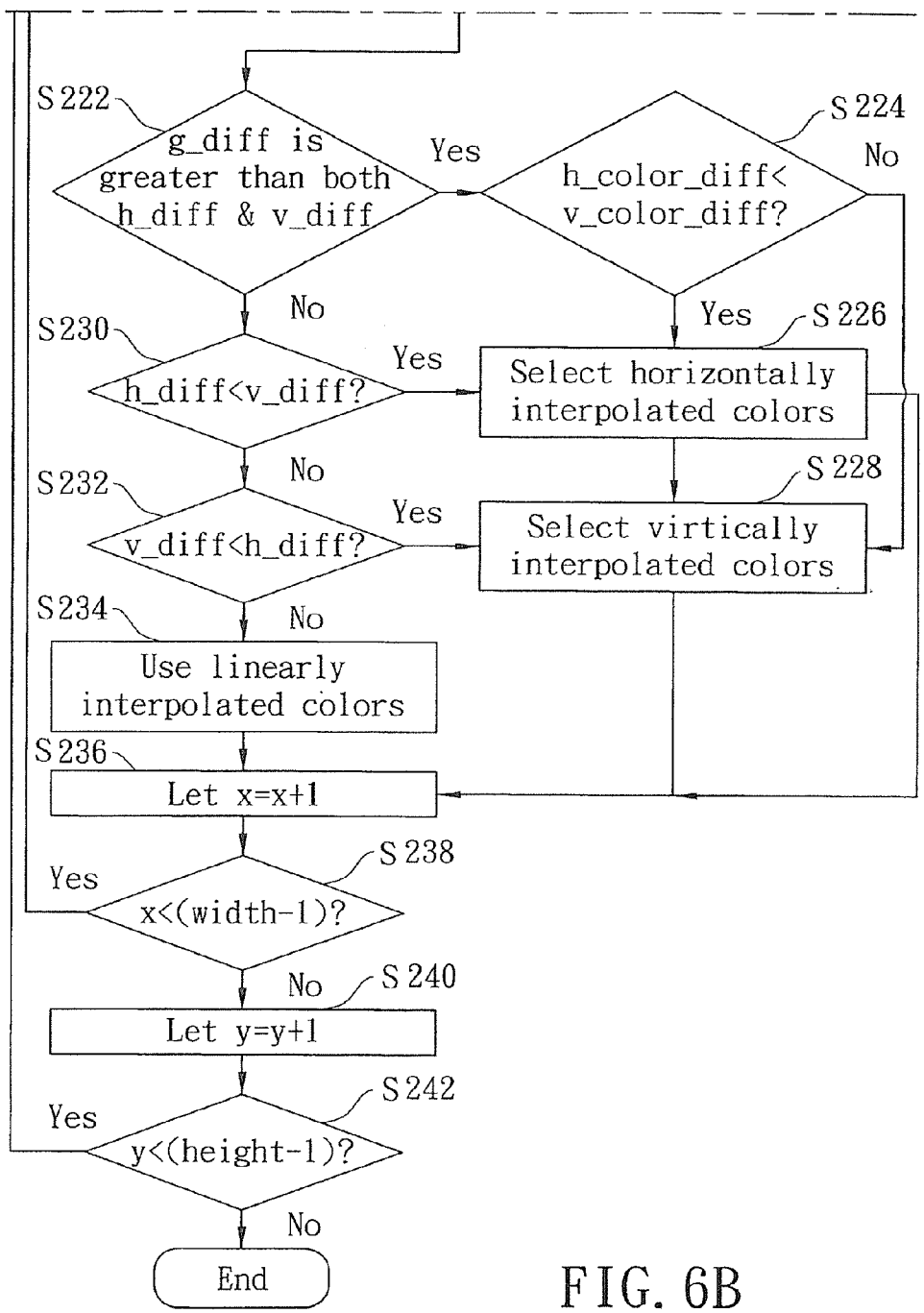

FIGS. 6A and 6B are a flow chart showing a preferred embodiment of the Bayer array interpolation method of the present invention. As shown in step S200, a Bayer pattern image is inputted, and a starting coordinate of the center pixel of the 3×3 pixel block is set to y=1 in step S202 and x=1 in step S204.

Figure 7:
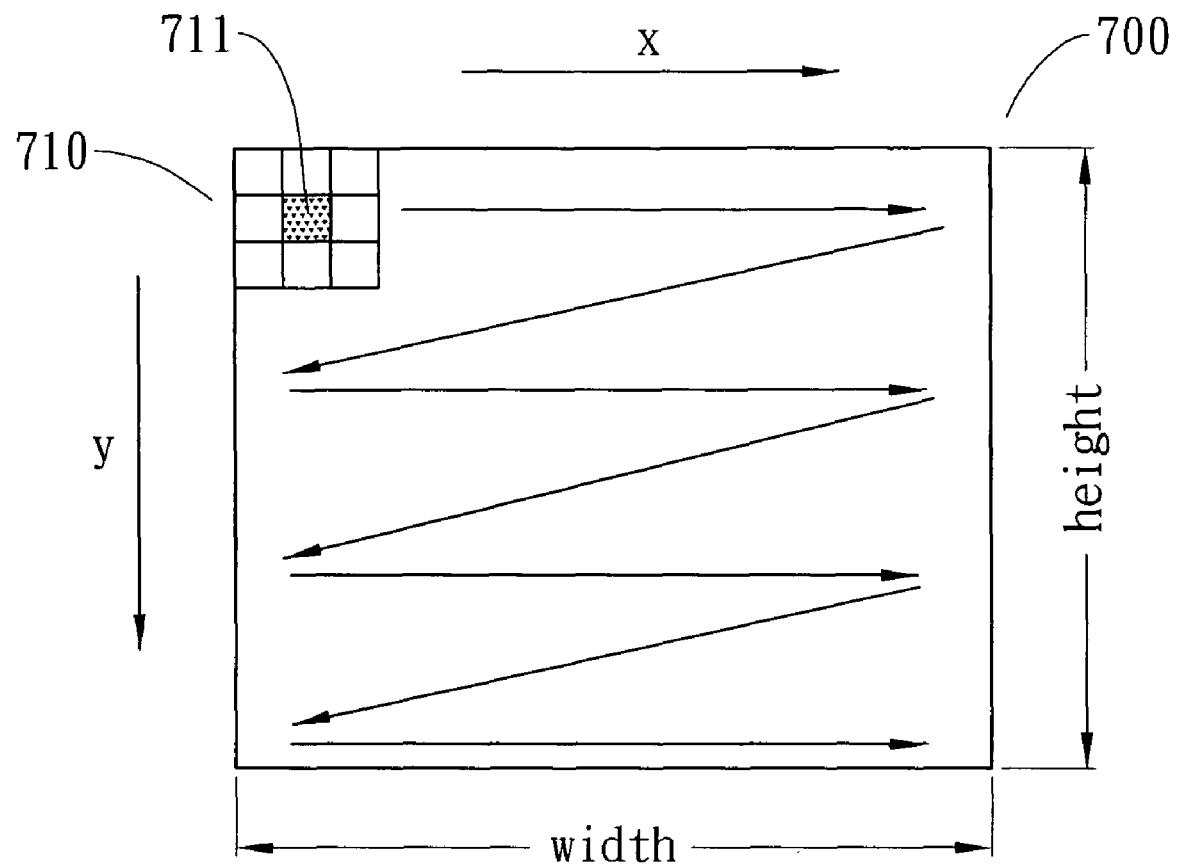
FIG. 7 is a conceptual diagram for illustrating a Bayer image and the order of color interpolation.

FIG. 7 is a conceptual diagram for illustrating a Bayer image and the order of color interpolation. As shown in FIG. 7, the dimension of the Bayer image 700 is width x height. FIG. 7 further shows a 3×3 pixel block 710 and it center pixel 711 that is colored in gray. The order of color interpolation is in raster-order as indicated by arrows.

In step S206, the Bayer interpolation case is determined based on those shown in FIG. 2.

Figure 3:
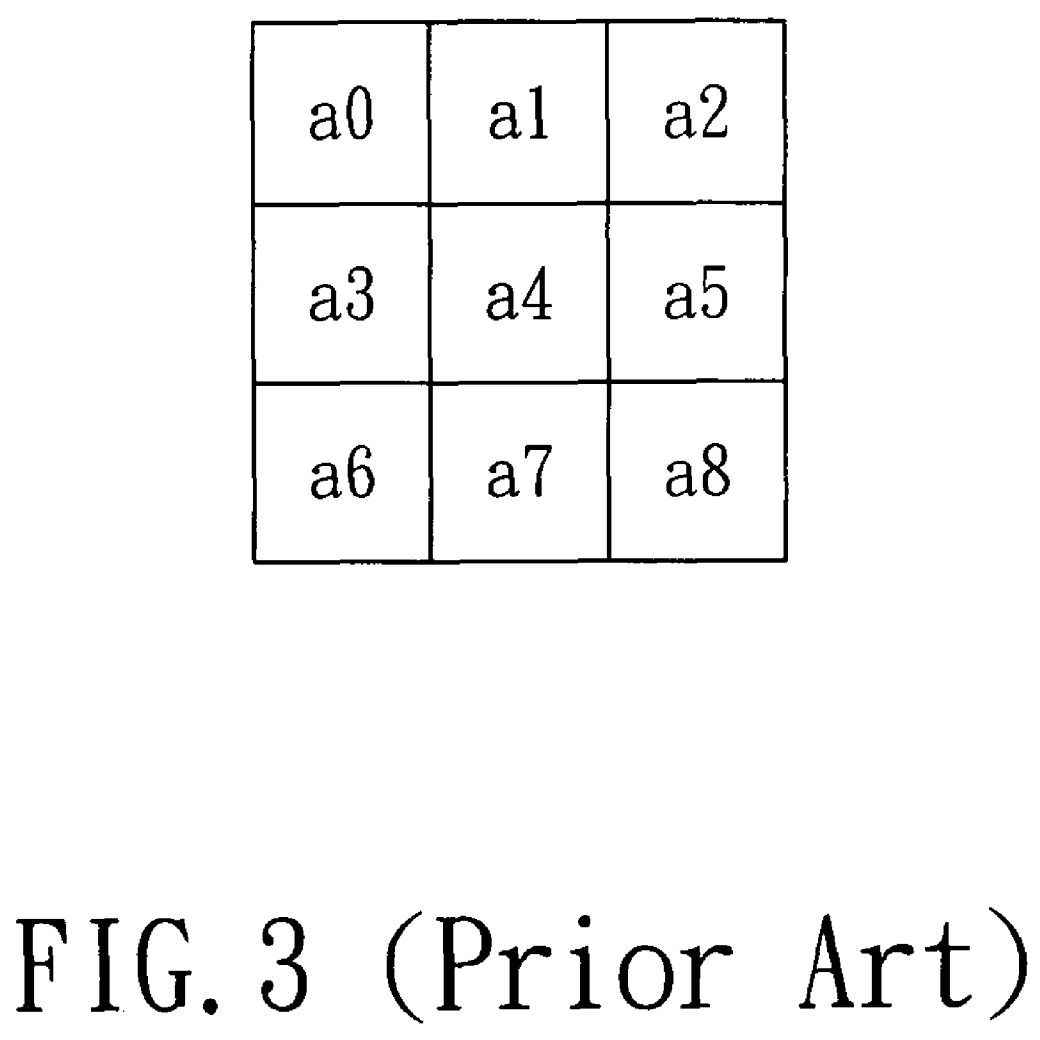

In step S208, a green pixel difference, horizontal pixel difference and vertical pixel difference are calculated with the reference of the 3×3 pixel block shown in FIG. 3. The horizontal pixel difference $h_{13}$ diff and vertical pixel difference v_diff are respectively given by $$h\_diff = |a0 + 2 \times a3 + a6 - a2 - 2 \times a5 - a8|, \text{ and}$$

$$v\_diff = |a0 + 2 \times a1 + a2 - a6 - 2 \times a7 - a8|.$$

However, the green pixel difference g_diff is obtained depending on the Bayer cases. If the Bayer case is either Case I or Case IV, the g_diff is given by $$g\_diff = |a4 - (a0 + a2 + a6 + a8)/4|.$$

On the other hand, if the Bayer case is either Case II or Case III, the g_diff is given by $$g\_diff = |a1 + a7 - a3 - a5|/2.$$

In step S210 a horizontal pixel average h_ave, vertical pixel average v_ave and corner pixel average corner_ave are respectively calculated by $$h\_ave = (a3 + a5)/2,$$

$$v\_ave = (a1 + a7)/2, \text{ and}$$

$$corner\_ave = (a0 + a2 + a6 + a8)/4.$$

In step S212, missing color components of the center pixel are interpolated in the horizontal direction depending on the Bayer case and are given as follows.

Case I: G center at R row $$R\_h = h\_ave$$

$B\_h=\text{clip}(a4+v\_ave-corner\_ave)$

Case II: R center $G\_h=h\_ave$ $B\_h=\text{clip}(G\_h+corner\_ave-v\_ave)$

Case III: B center $G\_h=h\_ave$ $R\_h=\text{clip}(G\_h+corner\_ave-v\_ave)$

Case IV: G center at B row $R\_h =\text{clip}(a4+v\_ave-corner\_ave)$ $B\_h=h\_ave$ The clip (x) function in the above equations is used to ensure the values inside the brackets are limited between 0 and 255, if the each value is represented by 8 bits. The clip (x) function is given as follows.

If x<0, then X=0;

if x>255, then X=255;

else x=x.

In step S214, the horizontal color difference is calculated from the horizontally interpolated color components in step S212 and is given as follows.

Case I:

$h\_color\_diff=|a4-R\_h|+|a4-B\_h|$

Case II:

$h\_color\_diff=|G\_h-a4|+|G\_h-B\_h|$

Case III:

$h\_color\_diff=|G\_h-R\_h|+|G\_h-a4|$

Case IV:

$h\_color\_diff=|a4-R\_h|+|a4-B\_h|$

Likewise, in step S216, the missing color components of the center pixel are interpolated vertically as follows.

Case I: G center at R row $R\_v=\text{clip}(a4+h\_ave-corner\_ave)$ $B\_v=v\_ave$ Case II: R center $G\_v=v\_ave$ $B\_v=\text{clip}(G\_v+corner\_ave-h\_ave)$ Case III: B center $G\_v=v\_ave$ $R\_v=\text{clip}(G\_v+corner\_ave-h\_ave)$ Case IV: G center at B row $R\_v=v\_ave$ $B\_v=\text{clip}(a4+h\_ave-corner\_ave)$ In step S218, the vertical color difference is calculated from the vertically interpolated color components in step 216 and is given as follows.

Case I:

$v\_color\_diff=|a4-R\_v|+|a4-B\_v|$

Case II:

$v\_color\_diff=|G\_v-a4|+|G\_v-B\_v|$

Case III:

$v\_color\_diff=|G\_v-R\_v|+|G\_v-a4|$

Case IV:

$v\_color\_diff=|a4-R\_v|+|a4-B\_v|$

After calculating the pixel differences and interpolating missing colors in both horizontal and vertical directions, the interpolated results being selected as the missing color values are determined by the following decisions.

In step S222, the green pixel difference g_diff is compared to both horizontal pixel difference h_diff and vertical difference v_diff to determine the pixel activity.

If g_diff is greater than both h_diff and v_diff, then the horizontal color difference h_color_diff and vertical color difference v_color_diff are compared, as shown in step S224.

If h_color_diff is smaller than v_color_diff, the horizontally interpolated color values in step S212 are selected in step S226. Whereas, if h_color_diff is not smaller than v_diff, then the vertically interpolated color values in step S216 are selected in step S228. After that, the interpolation process is then directed to step S236.

However, if the condition comparison in step S222 is not satisfied, then h_diff and the v_diff are further compared in step S230 and step S232. If h_diff is smaller than v_diff (S230), the horizontally interpolated color values in step S212 are selected in step S226. Whereas, if v_diff is smaller than h_diff (S232), then the vertically interpolated color values in step S216 are selected in step S228. Nevertheless, if the condition comparison is not satisfied in both S230 and S232, the missing color values will then be linearly interpolated as follows.

Case I: G center at R row $R\_v=h\_ave$ $B\_v=v\_ave$

Case II: R center $G\_v=(h\_ave+v\_ave)/2$ $B\_v=corner\_ave$

Case III: B center $G\_v=(h\_ave+v\_ave)/2$ $R\_v=corner\_ave$

Case IV: G center at B row $R\_v=v\_ave$ $B\_v=h\_ave$

If the $v_{13}$ diff and h_diff are equal, then use linearly interpolated colors. After interpolating the missing color components for the center pixel at coordinates (x,y), the horizontal coordinate x is increased by one as x=x+1 (S236). If x is still smaller than (width−1) (S238), the interpolation procedure returns to step S206. However, if the condition in S238 is not satisfied, then the vertical coordinate y is increased by one as y=y+1 in step S240 and y is compared with (height−1) in step S242. If the condition is satisfied in S242, then the interpolation procedure returns to step S204; whereas, if the condition is not satisfied in S242, then the missing color interpolation for the Bayer image is completed.

There are three advantages of this invention. First, since the missing colors are interpolated in the direction that gives either lower color difference or lower pixel difference, the interpolated image will has lower visual disturbance from the color differences. Second, since only a 3×3 pixel block is involved in the interpolation process, the hardware implementation complexity is significantly reduced compared to the 5×5 pixel block interpolation methods. Third, the interpolation process involves only simple arithmetic operations such as addition, subtraction, and logical bit operation, so the hardware implementation overheads can be reduced dramatically compared to the multiplication and division methods taught by Endo, et al. and Acharya, et al.

What is claimed is:

1. A color interpolation method for Bayer filter array images, comprising the steps of:

inputting a 3×3 Bayer pattern block with a center pixel;

determining a color filter interpolation case according to the type of the center pixel;

obtaining Bayer pixel averages and Bayer pixel differences in horizontal and vertical directions of the color filter interpolation case;

interpolating missing color components of the center pixel in the horizontal and vertical directions;

obtaining color differences in the horizontal and vertical directions based on the Bayer pixel differences and averages;

determining a pixel activity of the 3×3 Bayer pixel block; and selecting interpolated color components in the direction of lower color differences, when the pixel activity is high;

wherein the step of obtaining Bayer pixel averages and Bayer pixel differences in horizontal and vertical directions, further comprising the steps of:

calculating a green pixel difference g_diff, horizontal pixel difference hdiff and vertical pixel difference v_diff with the reference of a 3×3 pixel block shown in following, a0 a1 a2 a3 a4 a5 a6 a7 a8 wherein the horizontal pixel difference h_diff and vertical difference v_diff are respectively given by hdiff=|a0+2×a3+a6−a2−2×a5−a8|, and v_diff=|a0+2×a1+a2−a6−2×a7−a8|;

obtaining the green pixel difference g_diff depending on the Bayer cases, if the Bayer case is green center, the g_diff is given by g_diff=|a4−(a0+a2+a6+a8)/4 |, if the Bayer case is either red center or blue center, the g_diff is given by g_diff=|a1+a7−a3−a5|/2;

calculating a horizontal pixel average have, vertical pixel average v_ave and corner pixel average corner ave respectively by h_ave=(a3+a5)/2, v_ave=(a1+a7)/2, and corner_ave=(a0+a2+a6+a8)/4.

2. The color interpolation method for Bayer filter array images as recited in claim 1, further comprising the steps of:

determining the Bayer pixel differences in the horizontal and vertical directions, when the pixel activity is low;

selecting color interpolation results in the direction of lower Bayer pixel difference of the Bayer pixel differences, if the difference in one direction is significant than another; and using the Bayer pixel averages as interpolated colors, if the pixel differences in both horizontal and vertical directions are not significantly different.

3. The color interpolation method for Bayer filter array images as recited in claim 1, wherein the step of interpolating missing color components of the center pixel, further comprising the steps of:

interpolating missing color components of the center pixel in the horizontal direction, red R_h, blue B_h, green G_h, depending on the Bayer case, if the Bayer case is green center at red row, R_h=h_ave, B_h=clip(a4+v_ave−corner−ave), if the Bayer case is red center, G_h=h_ave, B_h=clip(G_h+corner_ave−v_ave), if the Bayer case is blue center, G_h=h_ave, R_h=clip(G_h+corner_ave−v_ave), if the Bayer case is green center at blue row, R_h=clip(a4+v_ave−corner_ave), B_h=h_ave, wherein the clip (x) function is given as following, if x<0, then X=0, if x>255, then X=255, else x=x;

calculating the horizontal color difference h_color_diff from the horizontally interpolated color components, if the Bayer case is green center at red row, h_color_diff=|a4−R_h|+|a4−B_h| if the Bayer case is red center, h_color_diff=|G_h−a4|+|G_h−B_h|, if the Bayer case is blue center, h_color_diff=|G_h−R_h|+|G_h−a4|, if the Bayer case is green center at blue row, h_color_diff=|a4−R_h|+|a4−B_h|;

interpolating missing color components of the center pixel in the vertical direction, red R_v, blue B_v, green G_v, depending on the Bayer case, if the Bayer case is green center at red row, Rv=clip(a4+h_ave−corner_ave), B_v =v_ave, if the Bayer case is red center, G_v =v_ave, B_v=clip(G_v+corner_ave−h_ave), if the Bayer case is blue center, G_v=v_ave, $R\_v=\text{clip}(G\_v+\text{corner\_ave}-h\_\text{ave})$, if the Bayer case is green center at blue row, $R\_v=v\_\text{ave}$, $B\_v=\text{clip}(a4+h\_\text{ave}-\text{corner\_ave})$; and calculating the vertical color difference v_color_diff from the horizontally interpolated color components, if the Bayer case is green center at red row, $v\_\text{color\_diff}=|a4-R\_v|+|a4-B\_v|$, if the Bayer case is red center, $v\_\text{color\_diff}=|G\_v-a4|+|G\_v-B\_v|$, if the Bayer case is blue center, $v\_\text{color\_diff}=|G\_v-R\_v|+|G\_v-a4|$, if the Bayer case is green center at blue row, $v\_\text{color\_diff}=|a4-R\_v|+|a4-B\_v|$.

4. The color interpolation method for Bayer filter array images as recited in claim 1, wherein the step of determining the pixel activity of the 3×3 Bayer pixel block, further comprising the steps of:
  comparing the green pixel difference g_diff is to both horizontal pixel difference h_diff and vertical difference v_diff to determine the pixel activity; comparing the horizontal color difference h_color diff and vertical color difference v_color diff, if g_diff is greater than both h_diff and v_diff;
  selecting the horizontally interpolated color values, if h_color diff is smaller than v_color_diff; and
  selecting the vertically interpolated color values, if h_color_diff is not smaller than v_color_diff.

5. The color interpolation method for Bayer filter array images as recited in claim 4, further comprising the steps of:
  comparing h_diff and the v_diff to determine the pixel activity, if g_diff is not greater than h_diff and v_diff;
  selecting the horizontally interpolated color values, if h_diff is smaller than v_diff;
  selecting the vertically interpolated color values, if v_diff is smaller than h diff; and
  using linearly interpolated colors, if the v_diff and h_diff are equal.

6. A color interpolation method for Bayer filter array images, comprising the steps of:
  inputting a 3×3 Bayer pattern block with a center pixel;
  determining a color filter interpolation case according to the type of the center pixel;
  obtaining Bayer pixel averages and Bayer pixel differences in horizontal and vertical directions of the color filter interpolation case;
  interpolating missing color components of the center pixel in the horizontal and vertical directions;
  obtaining color differences in the horizontal and vertical directions based on the Bayer pixel differences and averages;
  determining a pixel activity of the 3×3 Bayer pixel block; and
  selecting interpolated color components in the direction of lower color differences, when the pixel activity is high;
  wherein the step of interpolating missing color components of the center pixel, further comprising the steps of:
  interpolating missing color components of the center pixel in the horizontal direction, red R_h, blue B_h, green G_h, depending on the Bayer case, if the Bayer case is green center at red row, $R\_h=h\_\text{ave}$, $B\_h=\text{clip}(a4+v\_\text{ave}-\text{corner\_ave})$, if the Bayer case is red center, $G\_h=h\_\text{ave}$, $B\_h=\text{clip}(G\_h+\text{corner\_ave}-v\_\text{ave})$, if the Bayer case is blue center, $G\_h=h\_\text{ave}$, $R\_h=\text{clip}(G\_h+\text{corner\_ave}-v\_\text{ave})$, if the Bayer case is green center at blue row, $R\_h=\text{clip}(a4+v\_\text{ave}-\text{corner\_ave})$, $B\_h=h\_\text{ave}$, wherein the clip (x) function is given as following, if $x<0$, then $X=0$, if $x>255$, then $X=255$, else x=x;

calculating the horizontal color difference h_color_diff from the horizontally interpolated color components, if the Bayer case is green center at red row, $h\_\text{color\_diff}=|a4-R\_h|+|a4-B\_h|$ if the Bayer case is red center, $h\_\text{color\_diff}=|G\_h-a4|+|G\_h-B\_h|$, if the Bayer case is blue center, $h\_\text{color\_diff}=|G\_h-R\_h|+|G\_h-a4|$, if the Bayer case is green center at blue row, $h\_\text{color\_diff}=|a4-R\_h|+|a4-B\_h|$;

interpolating missing color components of the center pixel in the vertical direction, red R_v, blue B_v, green G_v, depending on the Bayer case, if the Bayer case is green center at red row, $R\_v=\text{clip}(a4+h\_\text{ave}-\text{corner\_ave})$, $B\_v=v\_\text{ave}$, if the Bayer case is red center, $G\_v=v\_\text{ave}$, $B\_v=\text{clip}(G\_v+\text{corner\_ave}-h\_\text{ave})$, if the Bayer case is blue center, $G\_v=v\_\text{ave}$, $R\_v=\text{clip}(G\_v+\text{corner\_ave}-h\_\text{ave})$, if the Bayer case is green center at blue row, $R\_v=v\_\text{ave}$, $B\_v=\text{clip}(a4+h\_\text{ave}-\text{corner\_ave})$; and calculating the vertical color difference v_color_diff from the horizontally interpolated color components, if the Bayer case is green center at red row, $v\_\text{color\_diff}=|a4-R\_v|+|a4-B\_v|$, if the Bayer case is red center, $v\_\text{color\_diff}=|G\_v-a4|+|G\_v-B\_v|$, if the Bayer case is blue center, $$v\_color\_diff=|G\_v-R\_v|+|G\_v-a4|,$$

if the Bayer case is green center at blue row, $$v\_color\_diff=|a4-R\_v|+|a4-B\_v|.$$

7. The color interpolation method for Bayer filter array images as recited in claim 6, further comprising the steps of:
   determining the Bayer pixel differences in the horizontal and vertical directions, when the pixel activity is low;
   selecting color interpolation results in the direction of lower Bayer pixel difference of the Bayer pixel differences, if the difference in one direction is significant than another; and
   using the Bayer pixel averages as interpolated colors, if the pixel differences in both horizontal and vertical directions are not significantly different.

8. The color interpolation method for Bayer filter array images as recited in claim 6, wherein the step of obtaining Bayer pixel averages and Bayer pixel differences in horizontal and vertical directions, further comprising the steps of:
   calculating a green pixel difference g_diff, horizontal pixel difference hdiff and vertical pixel difference v_diff with the reference of a 3×3 pixel block shown in following, $$\begin{array}{ccc} a0 & a1 & a2 \\ a3 & a4 & a5 \\ a6 & a7 & a8 \end{array}$$

wherein the horizontal pixel difference h_diff and vertical difference v_diff are respectively given by $$hdiff=|a0+2\times a3+a6-a2-2\times a5-a8|, \text{ and}$$

$$v\_diff=|a0+2\times a1+a2-a6-2\times a7-a8|;$$

obtaining the green pixel difference g_diff depending on the Bayer cases, if the Bayer case is green center, the g_diff is given by $$g\_diff=|a4-(a0+a2+a6+a8)/4|,$$

if the Bayer case is either red center or blue center, the g_diff is given by $$g\_diff=|a1+a7-a3-a5|/2;$$

calculating a horizontal pixel average have, vertical pixel average v_ave and corner
pixel average corner ave respectively by $$h\_ave=(a3+a5)/2,$$

$$v\_ave=(a1+a7)/2, \text{ and}$$

$$corner\_ave=(a0+a2+a6+a8)/4.$$

9. The color interpolation method for Bayer filter array images as recited in claim 6, wherein the step of determining the pixel activity of the 3×3 Bayer pixel block, further comprising the steps of:
   comparing the green pixel difference g_diff is to both horizontal pixel difference h_diff and vertical difference v_diff to determine the pixel activity;
   comparing the horizontal color difference h_color diff and vertical color difference v_color diff, if g_diff is greater than both h_diff and v_diff;
   selecting the horizontally interpolated color values, if h_color_diff is smaller than v_color_diff; and
   selecting the vertically interpolated color values, if h_color_diff is not smaller than v_color_diff.

10. The color interpolation method for Bayer filter array images as recited in claim 9, further comprising the steps of:
    comparing h_diff and the v_diff to determine the pixel activity, if g_diff is not greater than h_diff and v_diff;
    selecting the horizontally interpolated color values, if h_diff is smaller than v_diff;
    selecting the vertically interpolated color values, if v_diff is smaller than h diff; and
    using linearly interpolated colors, if the v_diff and h_diff are equal.

* * * * *